(12) United States Patent
Pasterkamp et al.

(10) Patent No.: US 6,733,090 B2
(45) Date of Patent: May 11, 2004

(54) HYDRAULIC VEHICLE BRAKING SYSTEM

(75) Inventors: Willem-Remco Pasterkamp, Moeglingen (DE); Werner Quirant, Beilstein (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/112,448

(22) Filed: Mar. 29, 2002

(65) Prior Publication Data

US 2002/0153767 A1 Oct. 24, 2002

(30) Foreign Application Priority Data

Mar. 30, 2001 (DE) ......................................... 101 16 203

(51) Int. Cl.[7] ............... B60T 8/32; B60T 8/44
(52) U.S. Cl. ............... 303/114.1; 188/358; 188/349; 188/195; 303/113.4; 303/113.5; 303/116.1; 303/155; 303/6.01; 303/9.75
(58) Field of Search ............... 30/114.1, 114.2, 30/113.4, DIG. 3, DIG. 4, 115.2, 84.1, 84.2, 155, 10, 115.4, 115.5, 116.1, 116.2, 113.2, 13–15, 113.5, 186, 6.01, 9.75; 188/358, 359, 349, 19.5; 701/70, 80; 180/197; 60/591, 582, 566

(56) References Cited

U.S. PATENT DOCUMENTS

| | | | |
|---|---|---|---|
| 5,941,608 A | | 8/1999 | Campau et al. |
| 6,076,897 A | * | 6/2000 | Binder et al. ............ 303/115.4 |
| 6,149,247 A | * | 11/2000 | Hofmann et al. ........ 303/113.4 |
| 6,186,602 B1 | * | 2/2001 | Jonner et al. ............ 303/115.4 |
| 6,192,685 B1 | * | 2/2001 | Bourlon et al. |
| 6,416,137 B2 | * | 7/2002 | Hofmann et al. ........ 303/113.4 |
| 2002/0153767 A1 | * | 10/2002 | Pasterkamp et al. ..... 303/114.1 |

FOREIGN PATENT DOCUMENTS

| | | |
|---|---|---|
| DE | 19636432 | 3/1998 |
| DE | 10116203 | * 10/2002 |
| JP | 30079 | * 10/2002 |
| WO | 98/28174 | 7/1998 |
| WO | 98/31576 | 7/1998 |

OTHER PUBLICATIONS

SAE Technical Papers Series No. 960991 entitled "Electro-hydraulic Brake System—The First Approach to a Brake-by-Wire-Technology", p. 111.

* cited by examiner

Primary Examiner—Douglas C. Butler
(74) Attorney, Agent, or Firm—Kenyon & Kenyon

(57) ABSTRACT

In a hydraulic vehicle braking systems operable via hydraulic external energy from a pump or, in the event the pump malfunctions, via hydraulic energy made available using a master brake cylinder via muscle-powered energy, provision is made for safe braking via muscle-powered energy such that at least one cylinder-piston configuration isolates at least two wheel brakes from the hydraulic pressure medium that is able to be pumped by the pump. The hydraulic vehicle-braking system incorporates wheel brakes of one axle that is isolated from a hydraulic pump in terms of pressure medium by a cylinder-piston configuration, which wheel brakes are supplied with pressure medium by one master cylinder chamber of a master brake cylinder. The other master brake cylinder chamber is allocated to the two other wheel brakes of the other vehicle axle, so that given bubble-free pressure medium downstream from the pump, the wheel brakes of both vehicle axles make a contribution to vehicle deceleration.

10 Claims, 3 Drawing Sheets

HYDRAULIC VEHICLE BRAKING SYSTEM

FIELD OF THE INVENTION

The present invention relates to a hydraulic vehicle braking system.

BACKGROUND INFORMATION

Known from published patent documents DE 196 36 432 A1 and WO 98/31576 are hydraulic vehicle braking systems having wheel brakes for four wheels distributed to a first and a second vehicle axle; a hydraulic external energy source; electrically controllable service brake valve configurations situated between the external energy source and the wheel brakes; a braking value indicator operable by a brake pedal for performing service braking via hydraulic external energy using the service brake valve configurations; a dual-circuit master brake cylinder that is operable via the brake pedal and has a first master brake cylinder chamber and a second master brake cylinder chamber for performing auxiliary braking via muscle-powered energy, a normally open operation mode switching valve that is controllable for the service braking operation in a closed position being situated in each brake circuit between the master brake cylinder and the wheel brakes being able to be supplied with pressure medium by this master brake cylinder, and at least the service brake valve configurations being controllable via a control and regulating device. In this context, the wheel brakes of a front vehicle axle belong to a first brake circuit, and the wheel brakes of a back vehicle axle are assigned to the second brake circuit. In the case of a power outage and a thus inoperable control and regulating device, the electrically controllable service brake valve configurations are not able to be put into operation, and the four wheel brakes of the two vehicle axles are connected through the normally open operation mode switching valves to the dual-circuit master brake cylinder. As a result, all four wheel brakes and, consequently, all wheels of the vehicle are able to be braked by muscle force on the brake pedal. In this context, starting from a vehicle to be equipped and from load examples to be assumed for this vehicle, one skilled in the art may determine a distribution of the braking force to the front wheel brakes and the back wheel brakes by selecting the dimensions of the brake components. The control and regulating device may be set up, for example, according to the SAE Technical Papers Series No. 960991 entitled "Electrohydraulic Brake System—The First Approach to a Brake-by-Wire-Technology," page 111, under the heading "Safety Concept," such that, in response to the failure of a service brake valve configuration, the control and regulating device determines whether using external energy for three wheels results in a shorter braking path or using muscle-powered energy for four wheels results in a shorter braking path in order after such a determination to control those valves resulting in the shorter braking path or to leave them alone. In this context it should be mentioned that on icy or snowy roads, for example, it may be better to brake four wheels using muscle-powered energy, thereby making the vehicle more easily controllable than in the case of asymmetrical braking using only three wheel brakes and operation via external energy. It cannot be completely ruled out that in the case of operation via external energy, air or gas dissolved in the hydraulic pressure medium results in the formation of air or gas bubbles due to a pressure drop in the hydraulic pressure medium. Air or gas bubbles in the hydraulic pressure medium make it compressible so that in the case of a sudden transition from the service braking operation via external energy to the auxiliary braking operation via muscle-powered energy, the disadvantage may arise that the air or gas bubbles are to be compressed via muscle-powered energy using the master brake cylinder. Since the master brake cylinder has a limited pump capacity for each brake pedal travel, it cannot be ruled out that as a result of the elasticity of the air or gas bubbles, the wheel brake pressure does not increase as much as desired for decelerating the vehicle.

A hydraulic vehicle braking system known from published patent document WO 98/28174 has wheel brakes for four wheels distributed to a first and a second vehicle axle; a hydraulic external energy source; electrically controllable service brake valve configurations situated between the external energy source and the wheel brakes; a braking value indicator operable by a brake pedal for performing service braking via hydraulic external energy using the service brake valve configurations; and a dual-circuit master brake cylinder operable by the brake pedal for performing auxiliary braking using muscle-powered energy, where a normally open operation mode switching valve that is able to be controlled for the service braking operation in a closed position is situated in each brake circuit between the master brake cylinder and the wheel brakes able to be supplied with pressure medium by this master brake cylinder; at least the service brake valve configurations are controllable by a control and regulating device; a cylinder-piston configuration is installed in each case between the wheel brakes of those vehicle axles designed for a greater contribution to the vehicle braking and the corresponding electrically controllable service brake valve configurations; and the wheel brakes designed for a greater contribution to the vehicle braking are connected to the operation mode switching valves associated with the two brake circuits of the master brake cylinder, has the advantage that the wheel brakes of this vehicle axle and the dual-circuit master brake cylinder are hydraulically isolated from the pressure medium that is able to be placed under pressure by a pump for the service braking operation and is able to be stored in pressure accumulator and, therefore, may contain air and/or gas in the form of bubbles, for example due to a pressure drop. In this respect, the combination of master brake cylinder and the two corresponding wheel brakes isolated from the pressure medium able to be pumped by the pump has the same degree of reliability as a conventional hydraulic vehicle braking system. Since only the wheel brakes of one vehicle axle are able to be braked via the pressure medium from the master brake cylinder, the vehicle axle that is typically the more loaded vehicle axle is selected for braking using the pressure medium from the master brake cylinder.

U.S. Pat. No. 5,941,608 discloses another hydraulic vehicle braking system that is set up, on the one hand, for braking four vehicle wheels via external energy using service brake valve configurations and, on the other hand, for braking via muscle-powered energy using a dual-circuit master brake cylinder. In this context, four cylinder-piston configurations are provided for isolating the four wheel brakes from the pressure medium that is able to be placed under pressure by a pump and is able to be controlled by the service brake valve configurations to direct against the individual pistons of the cylinder-piston configuration. As a result, braking pressure is able to be reliably generated in the four wheel brakes via the master brake cylinder and via the pressure medium contained therein. The necessary technical outlay for this is noticeably higher than for a hydraulic braking system according to U.S. Pat. No. 5,941,608.

SUMMARY OF THE INVENTION

The hydraulic vehicle braking system of the present invention is less expensive than the hydraulic vehicle braking system according to U.S. Pat. No. 5,941,608, and provided that no gas and/or air bubbles are present in the vehicle braking system, renders it nevertheless possible to brake via the wheel brakes of the vehicle axle contributing less to the vehicle deceleration, so that improved vehicle deceleration with typically better controllability of the vehicle is achieved in comparison to the hydraulic vehicle braking system according to document WO 98/28174.

One advantage of this invention is that, as a result of an individual operation mode switching valve being present for each wheel brake cylinder of a brake circuit, only one wheel brake is isolated from the master brake cylinder in the case of a technical malfunction, for example, and no longer contributes to braking. In addition, the same advantage may be provided for the vehicle axle whose wheel brakes contribute less to the total vehicle deceleration in the normal case. Another feature of the present invention results in the possibility of supplying two wheel brakes of a vehicle axle with pressure medium from the master brake cylinder via only one operation mode switching valve.

DETAILED DESCRIPTION

Figure 1:
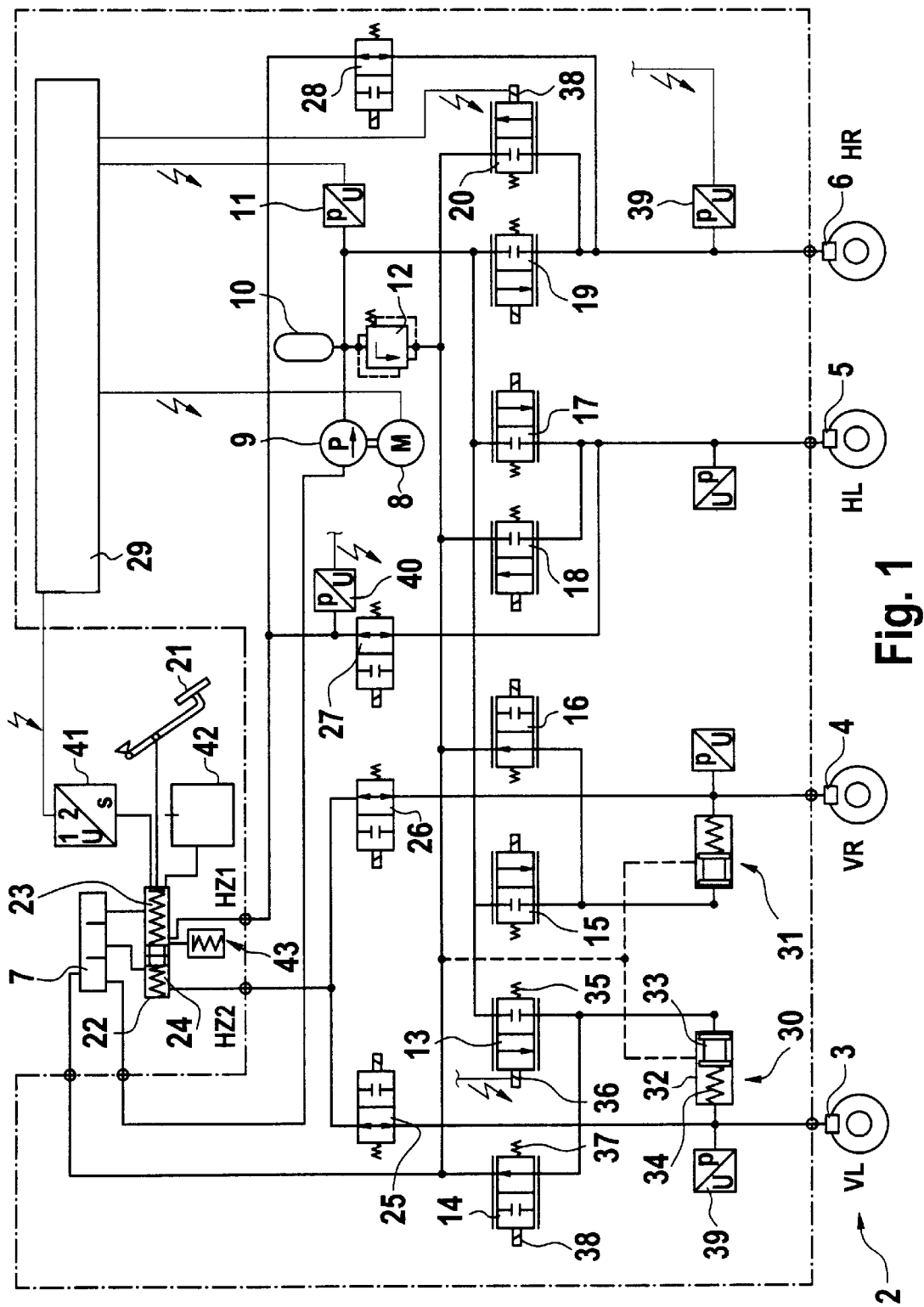
FIG. 1 shows a hydraulic circuit diagram for a first exemplary embodiment.

Hydraulic vehicle braking system 2 as shown in FIG. 1 has four wheel brakes 3, 4, 5, and 6, which are distributed on a first and a second vehicle axle (not shown); a hydraulic external energy source, which includes a supply tank 7, a pump 9 driven by an electromotor 8, a pressure accumulator 10, a pressure sensor 11, and a safety valve 12; electrically controllable service brake valve configurations 13 through 20, which are situated between this external energy source and wheel brakes 3 through 6; a dual-circuit master brake cylinder 22, which is operable via a brake pedal 21 and has a first master brake cylinder chamber 23 and a second master brake cylinder chamber 24 for powering wheel brakes 3 through 6; a normally open operation mode switching valve 25 and 26 between second master brake cylinder chamber 24 and wheel brakes 3 and 4, respectively; another normally open operation mode switching valve 27 and 28 between first master brake cylinder chamber 23 and wheel brakes 5 and 6, respectively; and a control and regulating device 29. Furthermore, cylinder-piston configurations 30, 31 are allocated to the wheel brakes of the vehicle axle (not shown) that makes a greater contribution to the vehicle braking. These each have a cylinder 32, a piston 33 movable therein, and a return spring 34 for piston 33. The appropriate cylinder 32 is connected to wheel brake 3 and 4, respectively, where return spring 34 supports itself in cylinder 32. The appropriate cylinder 32 is connected to a corresponding service brake valve configuration 13, 14, and 15, 16, respectively, where piston 33 assumes its initial position due to return spring 34. For example, wheel brakes 3 and 4 belong to the front axle of a passenger vehicle. In the case of a passenger vehicle, such a front axle is normally the axle designed for a greater contribution to vehicle braking.

Service brake valve configurations 13, 14 and 15, 16, respectively, are used, on the one hand, to lead pressure medium from pump 9 or pressure accumulator 10 into cylinder-piston configuration 30 and, on the other hand, to lead pressure medium from this cylinder-piston configuration 30 back to pressureless supply tank 7. In this context, service brake valve configuration 13 is represented as a two-connection valve of the directional control valve type that may be brought into its closed position by a spring 35 and may be opened to be more or less wide via an electromagnet 36. Service brake valve configuration 13 is often also referred to as a brake pressure build-up valve. In this instance, service brake valve configuration 14, which is assigned to same wheel brake 3, is also designed as a two-connection valve whose spring 37 may open service brake valve configuration 14 and whose electromagnet 38 maybe used to partially or completely close service brake valve configuration 14. Service brake valve configurations 13 and 14, which are each represented in the form of two squares associated with one another, are assigned parallel marks (not shown) that according to the ISO 1219 standard are the symbols for continuous adjustability between 0% and 100% of a constructively provided opening cross-section. It is inferable from FIG. 1 that service brake valve configurations 15, 17, and 19 have the same design as previously described with reference to service brake valve configuration 13. Furthermore, it is also inferable from FIG. 1 that service brake valve configuration 16 has the same design as previously described service brake valve configuration 14. Service brake valve configurations 18 and 20 have the same design as service brake valve configurations 17 and 19 and are, therefore, normally closed. In addition, reference is made to the fact that one skilled in the art may replace pairs of service brake valve configurations 13 and 14, 15 and 16, etc., with valves known in the field of vehicle braking systems, having three connections and three valve positions, in which case instead of two electromagnets 36 and 38, a single electromagnet able to be powered by different current intensities is sufficient. Furthermore, reference is also made to the fact that so-called pressure-regulating valves symbolized by a single square may also be installed instead of service brake valve configurations 13 through 20, which are symbolized in each case by a pair of squares. Pressure differences between pump 9 or pressure accumulator 10 and corresponding cylinder 32 on the one hand and between this corresponding cylinder 32 and pressureless supply tank 7 on the other hand may be adjusted via such pressure-regulating valves. For the purpose of supplying current, electromagnets 36 and 38 of service brake valve configurations 13 through 20 are connected to control and regulating device 29, this being represented for service brake valve configurations 20 and 13 by sketched electric lines.

As a result of wheel brakes 3 and 4 being allocated to a front axle contributing significantly to vehicle deceleration, wheel brakes 5 and 6 are back wheel brakes at a back axle (not shown) of the vehicle. These back wheel brakes 5 and 6 may be supplied via service brake valve configurations 17 and 19, respectively, with pressure medium from pump 9 or pressure accumulator 10 and may be connected via service brake valve configurations 18, 20 with pressureless supply tank 7, so that brake pressures that are achieved dissipate in wheel brakes 5 and 6 and may also be removed.

In this context, service brake valve configurations 13 through 20 of the "continuous valve" type shown in the exemplary embodiment as shown in FIG. 1 have the advantage that pressure medium flows to wheel brakes 3 through 6 or away from wheel brakes 3 through 6 which maybe constantly accelerated or decelerated. This is advantageous when adjusting brake pressures in wheel brakes 3 through 6 and also has a noise-lowering effect. In contrast, operation mode switching valves 25, 26, 27, and 28 are configured in a simple manner because they are not intended for changing the wheel brake pressures.

So that the previously mentioned adjusting of brake pressures in wheel brakes 3, 4, 5, and 6 is possible, an individual brake pressure sensor 39 is assigned to each wheel brake 3 through 6 in a manner known per se. As indicated for brake pressure sensor 39 of wheel brake 6, these brake pressure sensors 39 are connected via electric lines (not shown) to control and regulating device 29, so that wheel brake pressures present in wheel brakes 3, 4, 5, and 6 are available as actual values for evaluating control and regulating device 29.

An additional pressure sensor 40 is connected to first master brake cylinder chamber 23. This pressure sensor 40 is connected to control and regulating device 29 in the indicated manner. In addition and, in case of emergency, for redundancy, a displacement sensor 41, which is indirectly adjustable via brake pedal 21, is situated near master brake cylinder 22. In addition, a so-called brake lights switch 42 may be arranged near master cylinder 22 and may also be controlled via brake pedal 21. Displacement sensor 41 as well as brake lights switch 42 are connected to control and regulating device 29, so that it is able to receive signals from displacement sensor 41 and brake lights switch 42. The combination of brake pedal 21 and both sensors 40 and 41 is referred to as the braking value indicator. For example, short pedal paths are determined by displacement sensor 41 and large forces on brake pedal 21 are indirectly measured by pressure sensor 40.

If a power supply device (not shown) properly powers control and regulating device 29 and the latter is in order, a pressure variable signal from pressure sensor 11 is monitored by control and regulating device 29 and the electromotor, for example, is switched on as a function of the variable of the pressure signal in order to replenish pressure accumulator 10 via pump 9 with pressure medium from supply tank 7. When a preplanned pressure level is reached, control and regulating device 29 switches off electromotor 8. As a result, the hydraulic external energy source, including pressure accumulator 10, is available for braking actions using service brake valve configurations 13 through 20.

In response to brake pedal 21 being operated and brake lights switch 42 being consequently closed, the availability of the hydraulic external energy source detectable via pressure sensor 11 causes operation mode switching valves 25, 26, 27, and 28 to be electromagnetically brought into their blocking positions. As a result, master brake cylinder chambers 23 and 24 are hydraulically isolated from wheel brakes 3 through 6. In response to a further operation of brake pedal 21 and, in this context, with a cylinder-piston-spring configuration 43, which communicates with master brake cylinder chamber 23 and is, for example, of a type selectable from the related art referred to e.g. as a brake actuation simulator, pressure sensor 40 transmits a pressure signal and displacement sensor 41 transmits a displacement signal to control and regulating device 29. In a manner known in the art, this control and regulating device 29 is set up such that, in the case of a present pressure sensor signal and displacement sensor signal, the control and regulating device detects an initial zero wheel brake pressure display from brake pressure sensors 39 as a deviation and, in accordance with the deviation, controls service brake valve configurations 13, 15, 17, and 19, which are intended for building up brake pressure in the wheel brakes, in the sense of an at least partial opening. Since in this context brake pressure valve configurations 14, 16 are closed and operation mode switching valves 25 through 28 are controlled into their closed positions, all of the pressure medium flowing through service brake valve configurations 13, 15, 17, and 19 to wheel brakes 3 through 6 leads to increases in brake pressure. In this context, feedback is continuously provided via wheel brake pressure sensor 39 to control and regulating device 29, so that control and regulating device 29 detects the wheel brake pressure values approaching such values predefined by a driver operating the brake pedal, using pressure sensor 40 and/or displacement sensor 41. Of course, using pressure displays from pressure sensor 40 by means of software and a computer, control and regulating device 29 may be set up to calculate wheel brake pressures for front wheel brakes 3 and 4, which deviate from the wheel brake pressures provided for back wheel brakes 5 and 6 in the sense of a braking force distribution of a total braking force to front wheel brakes and back wheel brakes. Such a development of control and regulating device 29 may be desired since very different load possibilities may result in a vehicle having very different and possibly also very high locations of center of gravity.

In addition, reference is also made to the fact that control and regulating device 29 is able via wheel rotation sensors (not shown) and also via a yaw rate sensor (not shown), for example, to detect overbraking of the wheels or bad tracking when driving and, in compliance with the control algorithm derivable from the related art, is accordingly able to provide for brake-slip reduction or also for corrective yawing moments using asymmetrical braking. However, since brake-slip regulation and yaw moment generation supporting the driver are part of the related art as already indicated, it is not necessary to go into further detail here.

If during operation of a vehicle equipped with this hydraulic vehicle braking system the power supply of control and regulating device 29 fails for example, service brake valve configurations 13 through 20 are no longer controllable and remain in the basic position shown in FIG. 1 or return to it. A lack of current for control and regulating device 29 results in operation mode switching valves 25 through 28 assuming their basic position and returning to it. As a result, as may be seen from FIG. 1, that master brake cylinder chamber 24 communicates with wheel brakes 3 and 4, and master brake cylinder chamber 23 communicates with wheel brakes 5 and 6. Therefore, as a result of operating brake pedal 21 pressure medium is able to be pressed from both master brake cylinder chambers 23 and 24 to wheel brakes 3 and 4 as well as, wheel brakes 5 and 6, so that vehicle decelerations are only possible using muscle-powered energy.

It is first assumed that there are no air bubbles and no gas bubbles between pressureless supply tank 7 and service brake valve configurations 13, 15, 17, and 19, and moreover that no air bubbles and no gas bubbles are in wheel brakes 5 and 6. In any case, as a result of cylinder-piston configurations 30 and 31 known from the related art, the pressure medium in wheel brakes 3 and 4 and in master brake cylinder chamber 24 is free of gas bubbles and air bubbles. Therefore, in response to brake pedal 21 being actuated, all of the muscle-powered energy supplied to brake pedal 21 results in wheel brake pressures in all wheel brakes 3 through 6 for decelerating the vehicle.

If gas bubbles or air bubbles are contained in wheel brakes 5 and 6, which are able to contribute less than wheel brakes 3 and 4 to the deceleration of the vehicle, less brake pressure would be achieved than in wheel brakes 3 and 4 depending on the volume of gas or air contained in wheel brakes 5 and 6. This is a disadvantage generally only to be expected as an exception. However, this is contrasted by the advantage that, as already mentioned in the introductory part of the specification, those wheel brakes contributing the most to vehicle declaration are able to be used with great reliability, and that two further wheel brakes are able to help with vehicle deceleration even during the muscle-powered braking operation. This is particularly advantageous on slippery ice since front wheels, e.g., of passenger vehicles, have a tendency to lock up significantly earlier on slippery ice than back wheels when they are braked by conventional braking systems, for example. As already mentioned, this results in a deceleration gain in comparison with a hydraulic vehicle braking system described in WO 98/28174. Since this previously known vehicle braking system satisfies legal regulations, an improvement as a result of the embodiment of a hydraulic vehicle braking system as shown with reference to FIG. 1 is achievable in a particularly inexpensive manner.

Since in the exemplary embodiment according to FIG. 1 an individual operation mode switching valve 25, 26, 27, and 28, is situated between every wheel brake 3 through 6, respectively, and a corresponding master brake cylinder chamber 23 and 24, it is possible for example when one of service brake valves 13 or 15 or 17 or 19, which build up or increase the brake pressure, is no longer able to be brought into its open position, to bring one of operation mode switching valves 25 through 28 into its open position, so that, for example, three of the wheel brakes are able to be operated by hydraulic external energy and the remaining wheel brake is able to be supplied with pressure from one of master brake cylinder chambers 23 or 24. It is evident that there is only a partial failure of braking force at one wheel brake. It is clear that this results in only an insignificant reduction in vehicle deceleration, and the vehicle driver is able to compensate for a simultaneously generated yaw moment by steering or by stability regulation.

Figure 2:
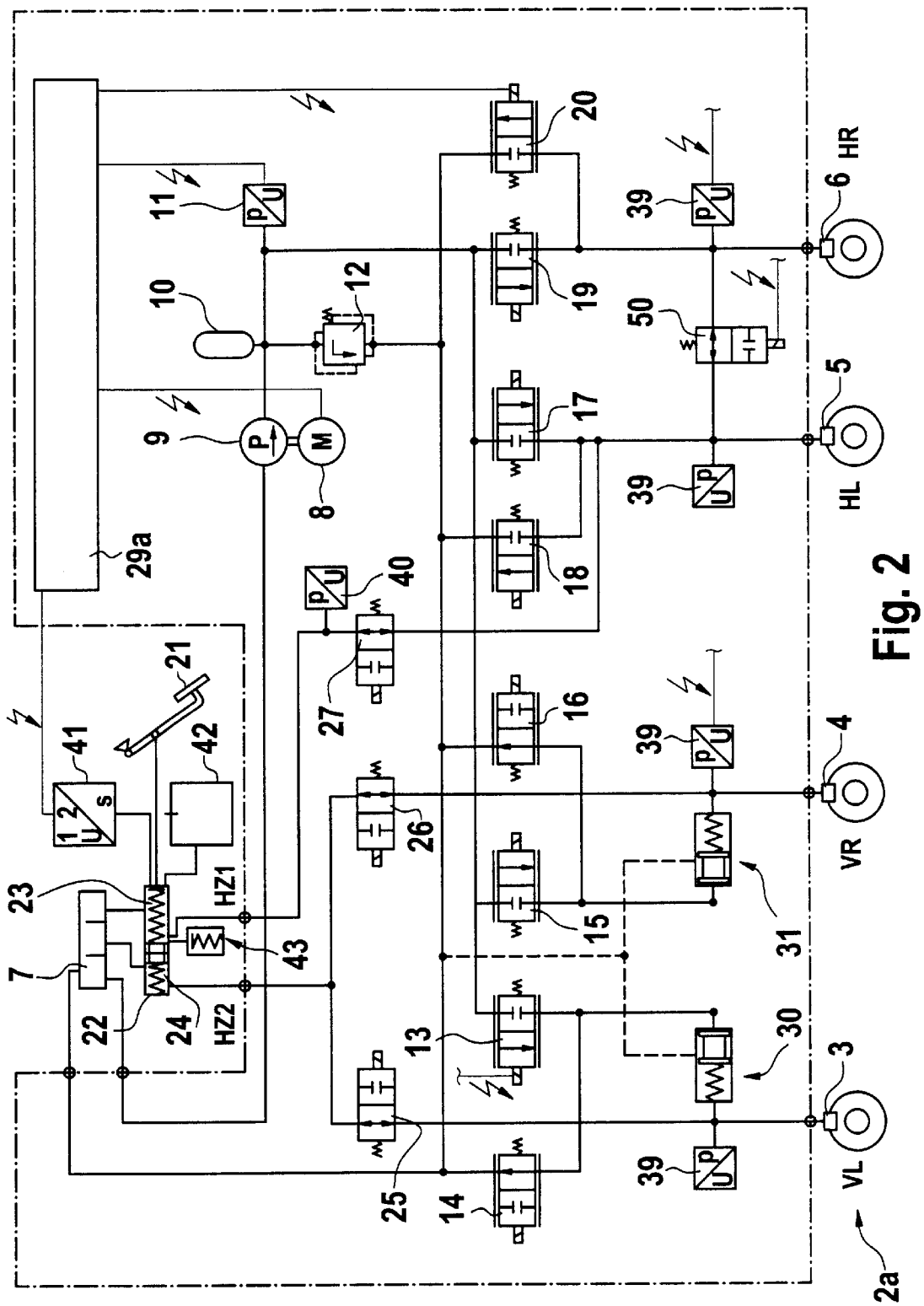
FIG. 2 shows a hydraulic circuit diagram for a second exemplary embodiment.

The second exemplary embodiment of a hydraulic vehicle braking system 2a according to FIG. 2 differs from the exemplary embodiment according to FIG. 1 in that a normally open brake pressure compensation valve 50 of an electrically controllable type is situated between two back wheel brakes 5 and 6, and operation mode switching valve 28 according to FIG. 1 is dispensed with. Accordingly, in the braking operation per muscle-powered energy on brake pedal 21, back wheel brake 5 on the one side is supplied with pressure medium for generating brake pressure and brake force as a result of open operation mode switching valve 27, and as a result of open brake pressure compensation valve 50, other back wheel brake 6 on the other side is also supplied with pressure medium for generating brake pressure and brake force. Since such a brake pressure compensation valve 50 between the wheel brakes of one axle, of a back wheel axle (not shown) in this instance, is known in the related art, e.g., according to document WO 98/28174, a description of the advantages is not necessary here. During normal service braking operation using hydraulic external energy, i.e., when there is no danger of wheel lockup at any of the wheels of this axle, it is sufficient to operate service brake valve configuration 17 to supply brake pressure to wheel brakes 5 and 6. After that, it is sufficient, e.g., to operate only service brake valve configuration 18 in order to lower a common brake pressure of wheel brakes 5 and 6 to a desired amount. In this context, pressure displays from one of the two brake pressure sensors 39 are used. However, if there is a danger of wheel lockup on one side, brake pressure compensation valve 50 is to be closed in a known manner, so that the brake pressure in a left wheel brake 5 or a right wheel brake 6 is changeable via brake pressure adjustment independently of the other wheel brake. For example, control and regulating device 29a is able to be set up such that, when service brake valve 17 is unable to open, service brake valve 19 is operated to adjust the brake pressures in wheel brakes 5 and 6. If control and regulating device 29a detects that an attempted operation of the service brake valve configuration also does not result in a pressure build-up, it provides for operation mode switching valve 27, which was previously closed for the service braking operation, to return to its open position, thereby making it possible to press pressure medium via muscle-powered energy on brake pedal 21 from master brake cylinder chamber 23 into wheel brakes 5 and 6 for the purpose of braking. It is recognizable that, due to brake pressure compensation valve 50, service brake valve configurations 17 and 19 are redundant valves for service braking operation via hydraulic external energy. In this respect, the degree of reliability in the service brake mode is increased. If all service brake valve configurations 17, 18, 19, and 20 of back wheel brakes 5 and 6 remain in their represented basic positions as a condition of a malfunction, the auxiliary braking operation is still able to be carried out via muscle-powered energy for these two back wheel brakes 5 and 6.

Figure 3:
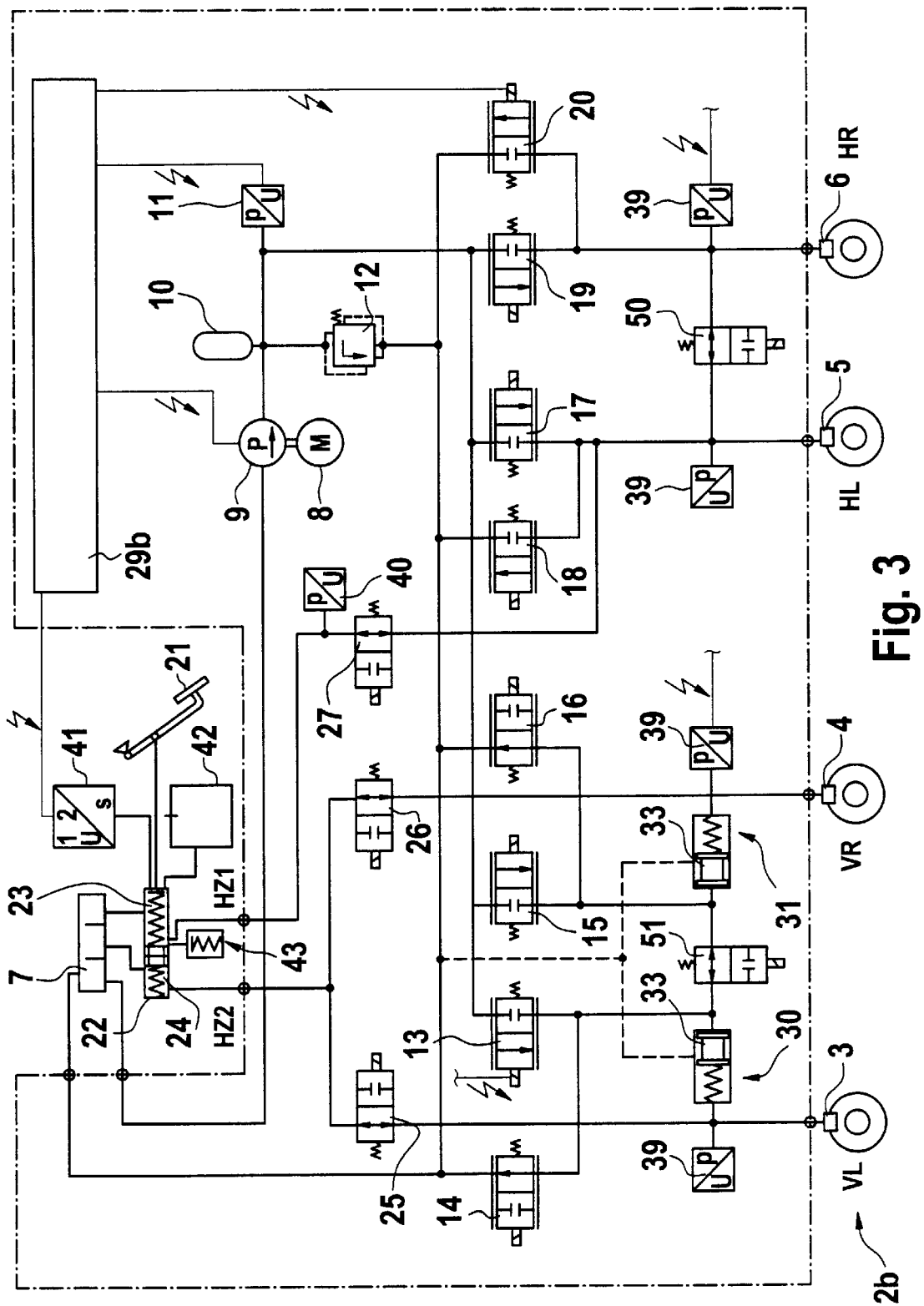
FIG. 3 shows a hydraulic circuit diagram for a third exemplary embodiment of the hydraulic vehicle braking system.

The third exemplary embodiment of a hydraulic vehicle braking system 2b according to FIG. 3 differs from the exemplary embodiment according to FIG. 2 in that an additional brake pressure compensation valve 51 is installed between both cylinder-piston configurations 30 and 31 and in this context, also between service brake valve configurations 13 and 15, which, as already described, are used to increase the brake pressure in an appropriate wheel brake 3 and 4, respectively. This additional brake pressure compensation valve 51 is also normally open, so that pistons 33 of both cylinder-piston configurations 30 and 31 are able to be pressurized equally. The recognizable result is that in service braking operation, and as long as there is still no danger of wheel lockup, a left wheel and a right wheel of a shared axle are braked equally and provide for an uninterrupted steerability of the vehicle. Of course for laterally unequal adjustment of wheel brake pressures, e.g., due to a danger of wheel lockup at only one wheel, brake pressure compensation valve 51 is to be closed.

Until now it was assumed that cylinder-piston configurations 30 and 31 are associated with front wheel brakes 3 and 4 since it was indicated that they make a greater contribution to vehicle deceleration than back wheel brakes 5 and 6, provided that these from wheel brakes correspond to an average passenger vehicle, for example. Since the hydraulic external force braking system is also set up for decelerating heavy vehicles, e.g., for braking trucks having dual tires in the back, reference is made to the fact that in such a case, cylinder-piston configurations 30 and 31 are allocated to the back wheels or their wheel brakes.

In addition, reference is also made to the fact that depending on the construction of master brake cylinder 22, wheel brakes 3 and 4 may be connected to master cylinder chamber 23 and wheel brakes 5 and 6 to master cylinder chamber 24.

What is claimed is:

1. A hydraulic vehicle braking system, comprising:

four wheel brakes for four wheels that are distributed to a first and a second vehicle axles;

a hydraulic external energy source;

a control-and-regulating device;

an electrically controllable service brake valve configuration situated between the external energy source and the wheel brakes, wherein the service brake valve configuration is controllable via the control-and-regulating device;

a braking value indicator operable by a brake pedal, for performing service braking via hydraulic external energy using the service brake valve configuration;

a dual-circuit master brake cylinder operable by the brake pedal, for performing auxiliary braking via muscle-powered energy;

a normally-open operation mode switching valve controllable for the service braking operation in a closed position, the switching valve being situated in each brake circuit between the master brake cylinder and the wheel brakes supplied with pressure medium by the master brake cylinder; and a cylinder-piston configuration disposed between wheel brakes of a vehicle axle that is adapted to make a greater contribution to vehicle braking and the corresponding electrically controllable service brake valve configuration;

wherein the wheel brakes adapted to make the greater contribution to vehicle braking are connected to the master brake cylinder, and wherein both wheel brakes of the vehicle axle adapted to make the greater contribution to vehicle braking are connected to a first master cylinder chamber, and wherein wheel brakes of a vehicle axle adapted to make a lesser contribution to vehicle deceleration are connected to a second master cylinder chamber of the master brake cylinder.

2. The hydraulic vehicle braking system as recited in claim 1, wherein each wheel brake adapted to be supplied with pressure medium by the first master cylinder chamber is connected via its own operation mode switching valve to the master brake cylinder.

3. The hydraulic vehicle braking system as recited in claim 1, wherein each wheel brake adapted to be supplied with pressure medium by the second master cylinder chamber is connected via its own operation mode switching valve to the master brake cylinder.

4. The hydraulic vehicle braking system as recited in claim 1, wherein both wheel brakes which are adapted to be supplied with pressure medium by the second master cylinder chamber are connected via an operation mode switching valve to the master brake cylinder, and wherein one of the two wheel brakes is indirectly connected via a normally open brake pressure compensation valve to the operation mode switching valve.

5. The hydraulic vehicle braking system as recited in claim 1, wherein the hydraulic external energy source includes at least one of a supply tank, a pump, a pressure accumulator, a pressure sensor and a safety valve.

6. The hydraulic vehicle braking system as recited in claim 1, wherein the hydraulic external energy source includes a supply tank and at least one of a pump and a pressure accumulator, and wherein the electrically controllable service brake valve configuration leads a pressure medium from one of the pump or pressure accumulator into the cylinder-piston configuration and back from the cylinder-piston configuration to the supply tank.

7. The hydraulic vehicle braking system as recited in claim 1, wherein the service brake valve configuration is of the continuous valve type.

8. The hydraulic vehicle braking system as recited in claim 1, wherein an individual brake pressure sensor is assigned to each wheel brake, each sensor communicating with the control and regulating device.

9. A hydraulic vehicle braking system, comprising:

four wheel brakes, including two front brakes and two back brakes, for four wheels that are distributed to first and second vehicle axles;

a hydraulic external energy source;

a control-and-regulating device;

an electrically controllable service brake valve configuration situated between the external energy source and the wheel brakes, wherein the service brake valve configuration is controllable via the control-and-regulating device;

a braking value indicator operable by a brake pedal, for performing service braking via hydraulic external energy using the service brake valve configuration;

a dual-circuit master brake cylinder operable by the brake pedal, for performing auxiliary braking via muscle-powered energy;

a normally-open operation mode switching valve controllable for the service braking operation in a closed position, the switching valve being situated in two front brake circuits and one back brake circuit between the master brake cylinder and the wheel brakes supplied with pressure medium by the master brake cylinder;

a first normally open brake pressure compensation valve situated between the two back wheel brakes; and a cylinder-piston configuration disposed between wheel brakes of a vehicle axle that is adapted to make a greater contribution to vehicle braking and the corresponding electrically controllable service brake valve configuration;

wherein the wheel brakes adapted to make the greater contribution to vehicle braking are connected to the master brake cylinder, and wherein both wheel brakes of the vehicle axle adapted to make the greater contribution to vehicle braking are connected to a first master cylinder chamber, and wherein wheel brakes of a vehicle axle adapted to make a lesser contribution to vehicle deceleration are connected to a second master cylinder chamber of the master brake cylinder.

10. The hydraulic vehicle braking system as recited in claim 9, wherein the braking system includes two cylinder-piston configurations with a second brake pressure compensation valve in between.

* * * * *

UNITED STATES PATENT AND TRADEMARK OFFICE
CERTIFICATE OF CORRECTION

PATENT NO. : 6,733,090 B2
DATED : May 11, 2004
INVENTOR(S) : Willem-Remco Pasterkamp et al.

It is certified that error appears in the above-identified patent and that said Letters Patent is hereby corrected as shown below:

Column 4,
Line 17, change "maybe used to" to -- may be used to --
Line 67, change "which maybe" to -- which may be --

Column 8,
Line 51, change "these from wheel brakes" to -- these front wheel brakes --
Line 66, change "a first and a second vehicle axles" to -- a first and a second vehicle axle --

Signed and Sealed this

Twenty-sixth Day of July, 2005

JON W. DUDAS
*Director of the United States Patent and Trademark Office*